(12) United States Patent
Warrier

(10) Patent No.: US 10,154,119 B2
(45) Date of Patent: Dec. 11, 2018

(54) GROUP BROWSING AND USAGE OF FIORI APPLICATIONS

(71) Applicant: SAP SE, Walldorf (DE)

(72) Inventor: Srinath Warrier, Thane (IN)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 15/169,171

(22) Filed: May 31, 2016

(65) Prior Publication Data

US 2017/0344228 A1 Nov. 30, 2017

(51) Int. Cl.
*G06Q 10/02* (2012.01)
*H04L 29/06* (2006.01)

(52) U.S. Cl.
CPC .......... *H04L 67/42* (2013.01); *G06Q 10/025* (2013.01)

(58) Field of Classification Search
CPC .............................. G06Q 10/02; G06F 3/0488
USPC ......................... 715/739, 763, 765
See application file for complete search history.

(56) References Cited

U.S. PATENT DOCUMENTS

| | | | |
|---|---|---|---|
| 2010/0228577 A1* | 9/2010 | Cunningham | G06Q 10/02 705/5 |
| 2014/0282040 A1* | 9/2014 | Alfaro | H04L 51/20 715/739 |
| 2015/0112749 A1* | 4/2015 | Erdal | G06F 3/04842 705/7.19 |
| 2016/0104079 A1* | 4/2016 | Greenberg | G06F 3/0488 705/5 |

* cited by examiner

Primary Examiner — Cao H Nguyen
(74) Attorney, Agent, or Firm — Buckley, Maschoff & Talwalkar LLC

(57) ABSTRACT

A method and system including a display; a memory storing processor-executable process steps; and a processor to execute the processor-executable process steps to cause the system to: present a user interface on a display, the user interface including one or more sub-actions associated with a core action, and one or more user-entry sub-action fields associated with the one or more sub-actions; receive data in one or more of the displayed user-entry sub-action fields, wherein the received data is entered by a first user; present a sharable action indicator in response to reception of the data in the one or more displayed user-entry sub-action fields; in response to a first user selection of the sharable action indicator, display a list of one or more additional users; and in response to selection by the first user of at least one of the one or more additional users, transmit a notification to the selected one or more additional users indicating that the core action has been shared with them by the first user. Numerous other aspects are provided.

20 Claims, 18 Drawing Sheets

Plan Travel – Kate Jacob

Currency

305n — Local Currency: Rupee  Date 322
305p — Currency Rate
305o — Destination Currency: Euro  Date 322

Travel Document Information

305q — VISA
305r — Passport: 1234567

Invitation Letter

305s — Inviting Employee: Robert.Smith@xyz.com

Address Proof Letter

305t — Local HR: localHR@xyz.com

Laptop Authorization Letter

305u — Local IT: localIT@xyz.com

326 — Submit

*FIG. 5*

Plan Travel – John Smith

Currency
- 305n — Local Currency: Rupee — Date (322)
- 305o — Destination Currency: Euro — Date (322)
- 305p — Currency Rate Travel Document Information
- VISA: 1234567
- 305q
- 305r — Passport Invitation Letter
- Inviting Employee: Robert.Smith@xyz.com
- 305s Address Proof Letter
- Local HR: localHR@xyz.com
- 305t Laptop Authorization Letter
- Local IT: localIT@xyz.com
- 305u Submit (326)

*FIG. 10*

Plan Travel – John Smith

Share Action with:

338 — This Action has been Shared with:
Abe.Abrams@xyz.com
George.White@xyz.com
Martha.Jones@xyz.com Submit

FIG. 11

Pre Book Cab Ride – John Smith

1305a Source Location: 200 First Ave ⌐1322
1305b Destination Location: Airport ⌐1322
1305c Departure Date: 20th April 2016 ▶
1305d Cab Type: UberX
1305e Departure Time: 8:00PM ▶
1305f Coupon Code: UBER123

[Submit] ⌐1326

GROUP BROWSING AND USAGE OF FIORI APPLICATIONS

BACKGROUND

Enterprises typically use software applications and application-related services in the execution of their businesses. An enterprise application may have multiple users working together on the application in real-time. A conventional approach is for Person A to trigger an action, which may send a request to Person B. Person B may eventually receive the request as a notification and then perform another action. Person A may then receive a notification that the action was completed. This conventional approach may not allow for real-time simultaneous work. While a "real-time chat" may be available to supplement the foregoing process, the actions still need to be typed and explained repeatedly between Person A and Person B, which may be time-consuming and cumbersome.

Systems and methods are desired which support easy collaboration and sharing of actions.

BRIEF DESCRIPTION OF THE DRAWINGS

FIG. 5 is an outward view of a graphical interface according to some embodiments.

FIG. 10 is an outward view of a graphical interface according to some embodiments.

FIG. 11 is an outward view of a graphical interface according to some embodiments.

FIG. 17 is an outward view of a graphical interface according to some embodiments.

DETAILED DESCRIPTION

Figure 1:
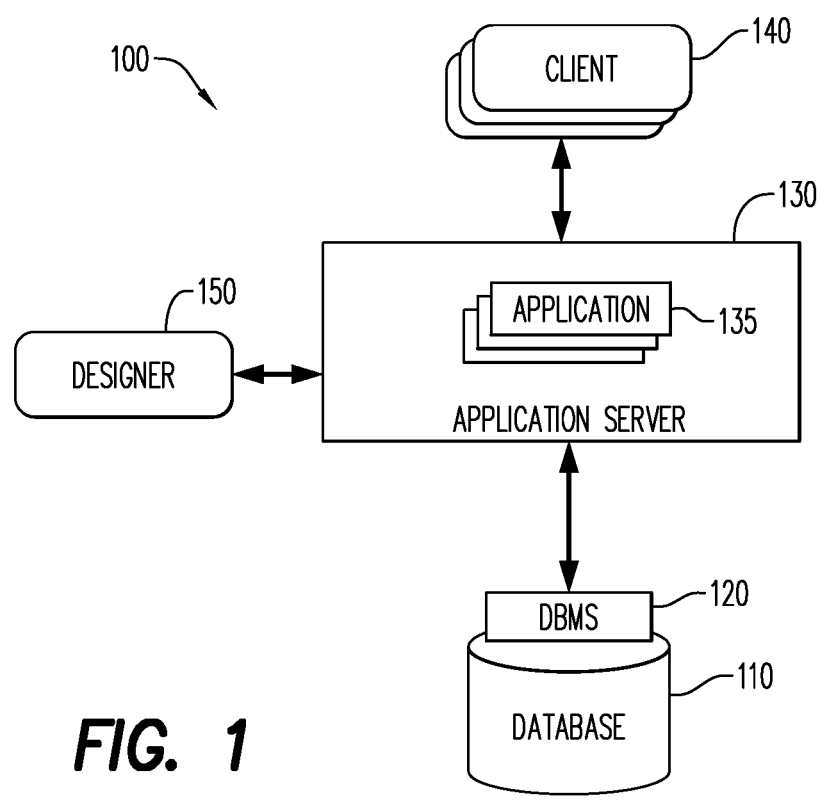
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Enterprises typically use software applications and application-related services in the execution of their businesses. Enterprise applications may have multiple users working together on the application in real-time. A conventional approach is for Person A to trigger an action, which may send a request to Person B. Person B may eventually receive the request as a notification and then perform another action. Person A may then receive a notification that the action was completed. This conventional approach may not allow for real-time simultaneous work. While a "real-time chat" may be available, the actions still need to be typed and explained repeatedly between Person A and Person B, which may be time-consuming and cumbersome.

Some embodiments may include an application ("app") that defines a core action and one or more sub-actions associated with the core action. The core action may be the overall task for which the application is intended, and the sub-actions may be individual smaller tasks associated with the core action that facilitate completion of the core action. An order of completion of the sub-actions may be specified. A user may complete the core action via the completion of sub-actions, instead of engaging in the typical back and forth between multiple people to explain the different actions described above.

As used here, the term "app" refers to a self-contained program or piece of software designed to fulfill a particular purpose. The first person using the application may share the application with one or more other users, who may re-use the application ("re-usable app") to save time. The core action may be, for example, entering time in a time-sheet; and the sub-actions may be creating a timesheet and entering the time.

Conventionally, Person A, Person B and Person C may each create the same timesheet template and each fill out the time sheet, such that each of Persons A, B and C are performing the same tasks. In one or more embodiments, Person A creates the single timesheet template, which may be designated as a sharable action, and fills out the timesheet, which also may be designated as a sharable action. Person A creates a group of 3 users—Person A, Person B and Person C. Person B and Person C may each get notifications about the sharable actions with the option to accept or decline. Person B may work the same shift as Person A, and may accept the filled-out time sheet as his own, instead of creating his own timesheet and filling it out, thereby saving time and resources. Person C may work the same shift as Person A, but had a sick-day and was not at work one of the days. In that case, Person C may change the pre-filled-out time sheet to reflect this difference, instead of creating his own timesheet and filling it out, thereby saving time and resources.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135, clients 140 and designer 150. Applications 135 may comprise server-side executable program code (e.g., compiled code, scripts, etc.) executing within application server 130 to receive queries from clients 140 and provides results to clients 140 based on data of database 110. One such application 135 may comprise a travel plan application. Applications 135 executing within application server 130 may also provide user interfaces to designer 150 to facilitate the creation of sharable core actions as described herein. These sharable core actions may be used by the aforementioned travel plan application to present sharable core actions to clients 140.

Application server 130 provides any suitable interfaces through which clients 140 and designer 150 may communicate with applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the travel plan example, database 110 may store location information (e.g., city, country), hotel information (e.g., city, location), employee information (e.g., home address, e-mail address, travel document information) and/or any other data for providing an travel plan application.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Designer 150 and each of clients 140 may comprise one or more individuals or devices executing program code of a software application for presenting user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

Figure 2:
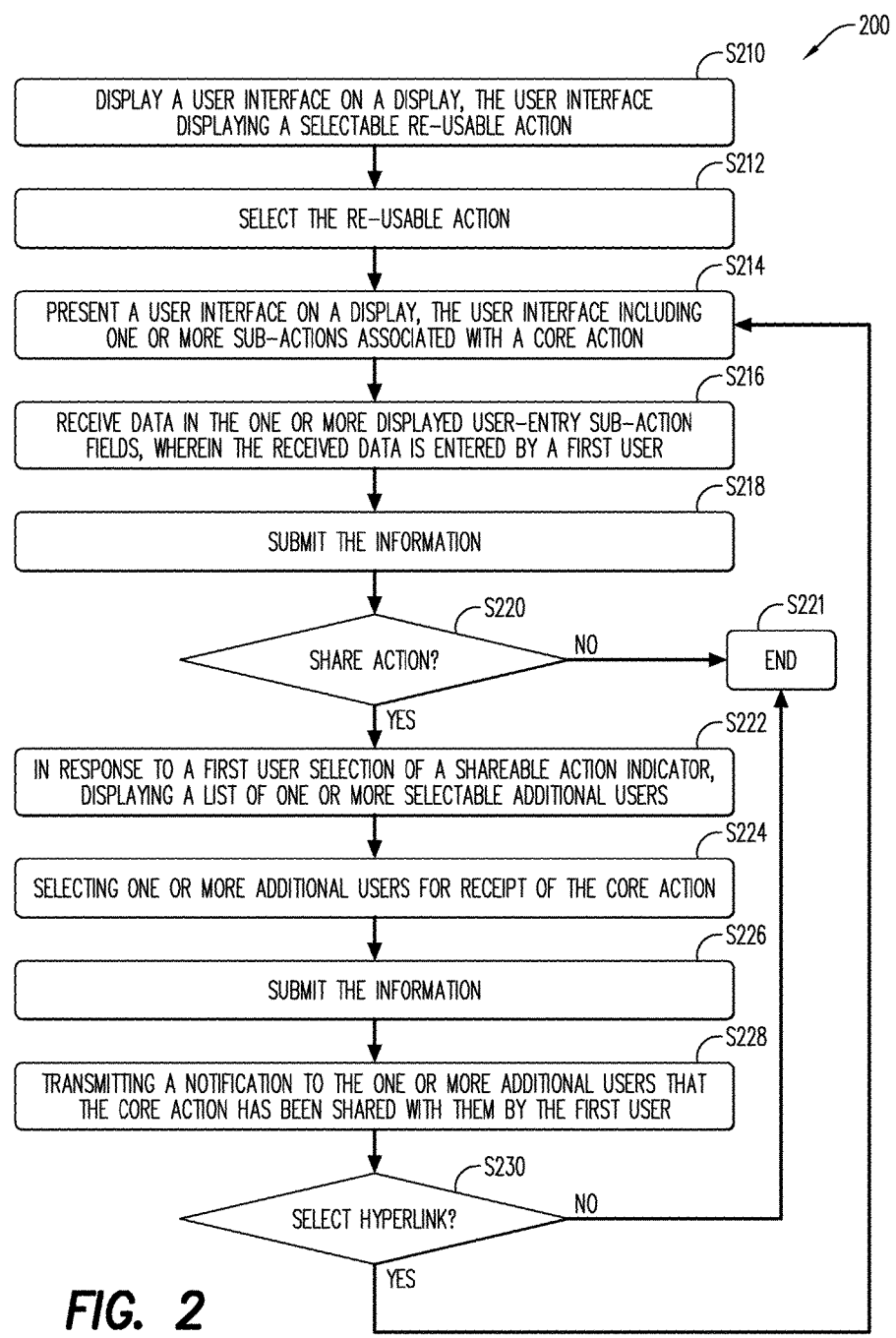
FIG. 2 is a flow diagram of a process according to some embodiments.
Figure 3:
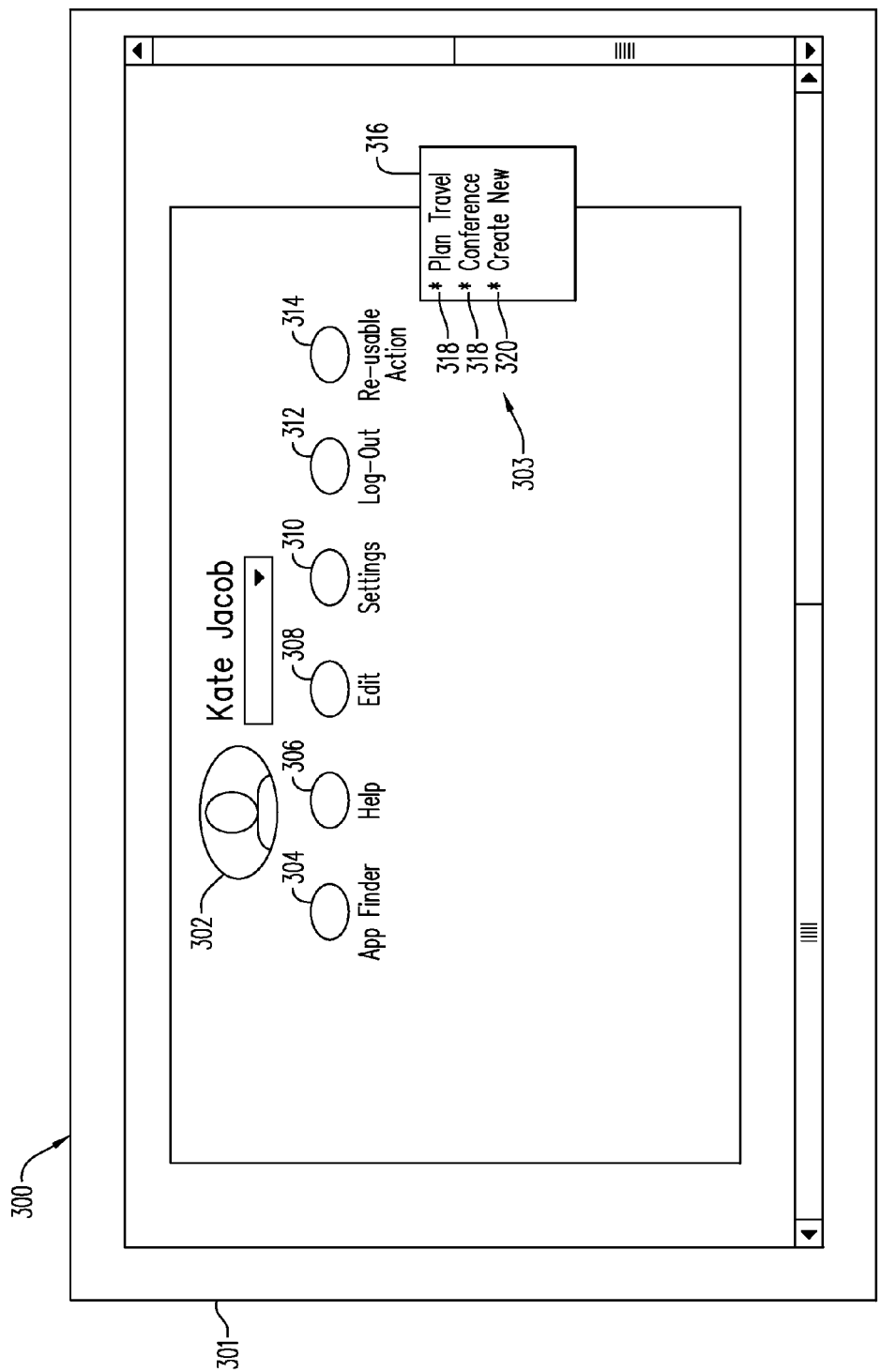
FIG. 3 is an outward view of a graphical interface according to some embodiments.
Figure 4:
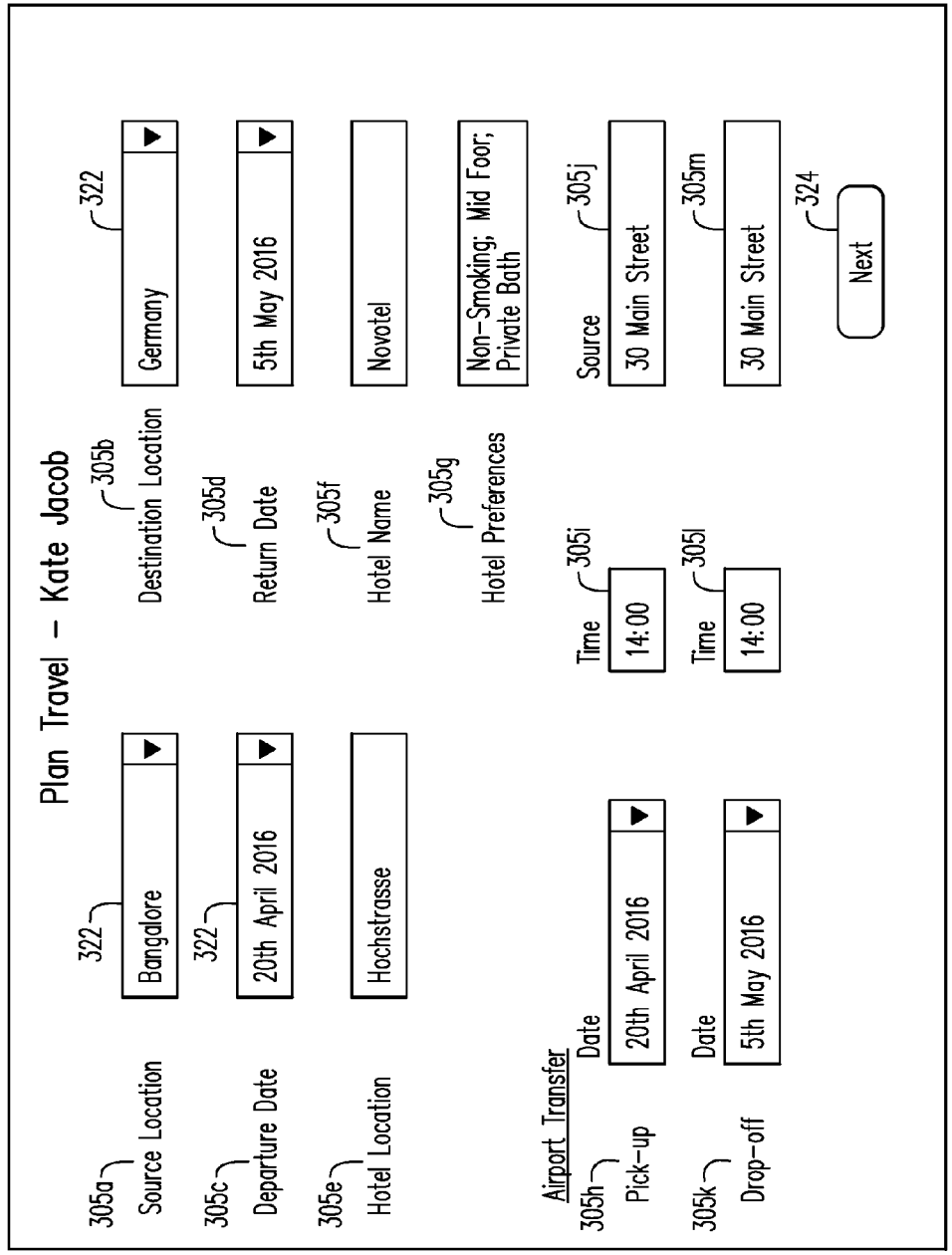
FIG. 4 is an outward view of a graphical interface according to some embodiments.
Figure 6:
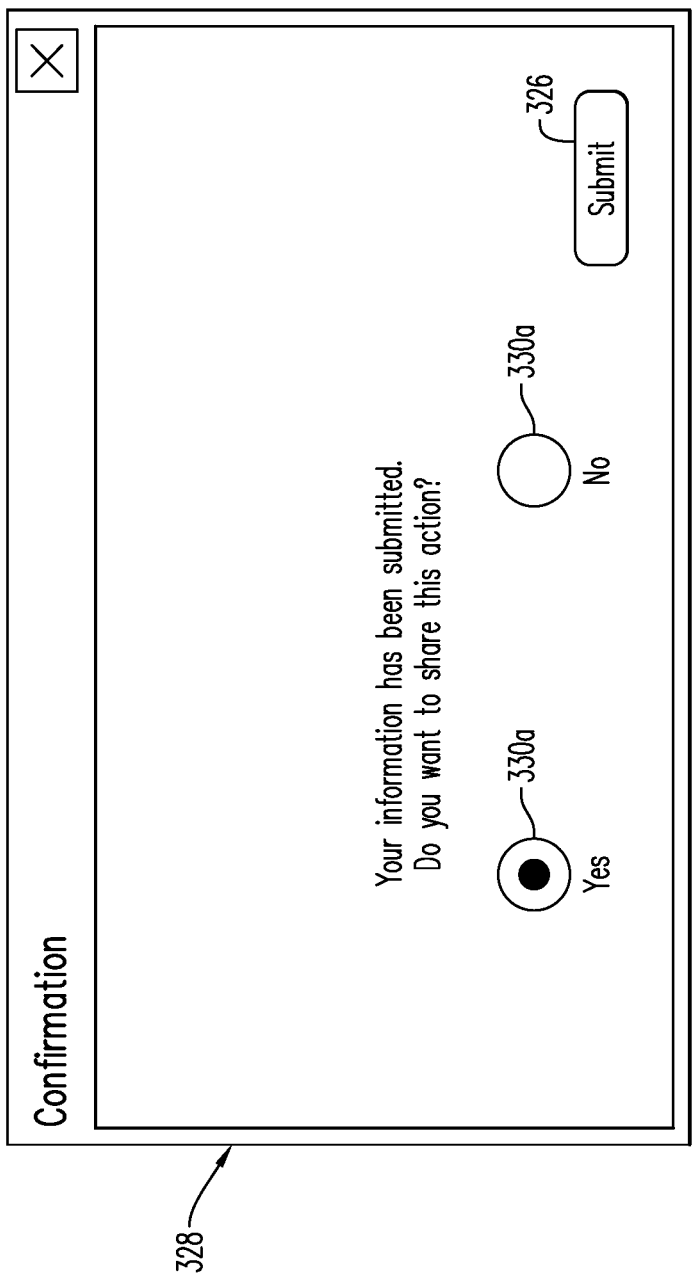
FIG. 6 is a text box according to some embodiments.
Figure 12:
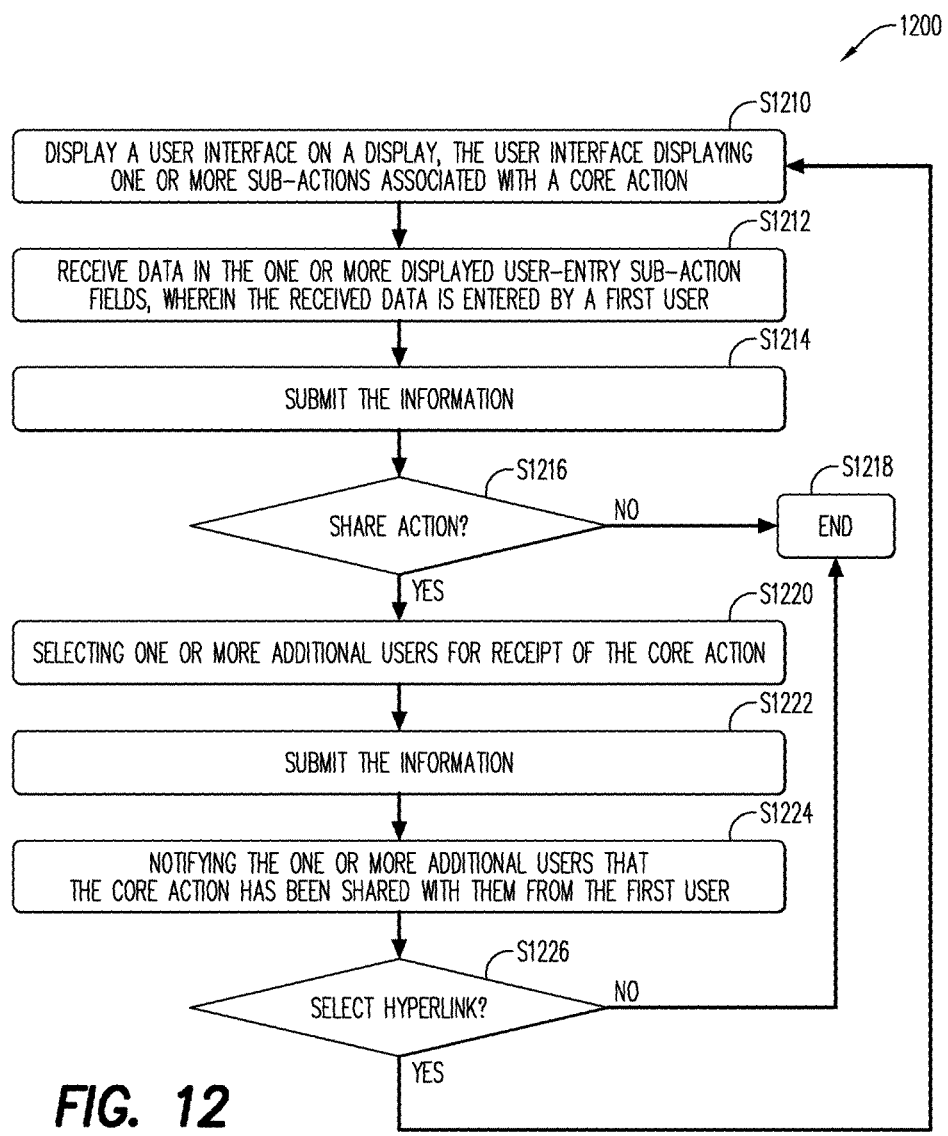
FIG. 12 is flow diagram of a process according to some embodiments.
Figure 13:
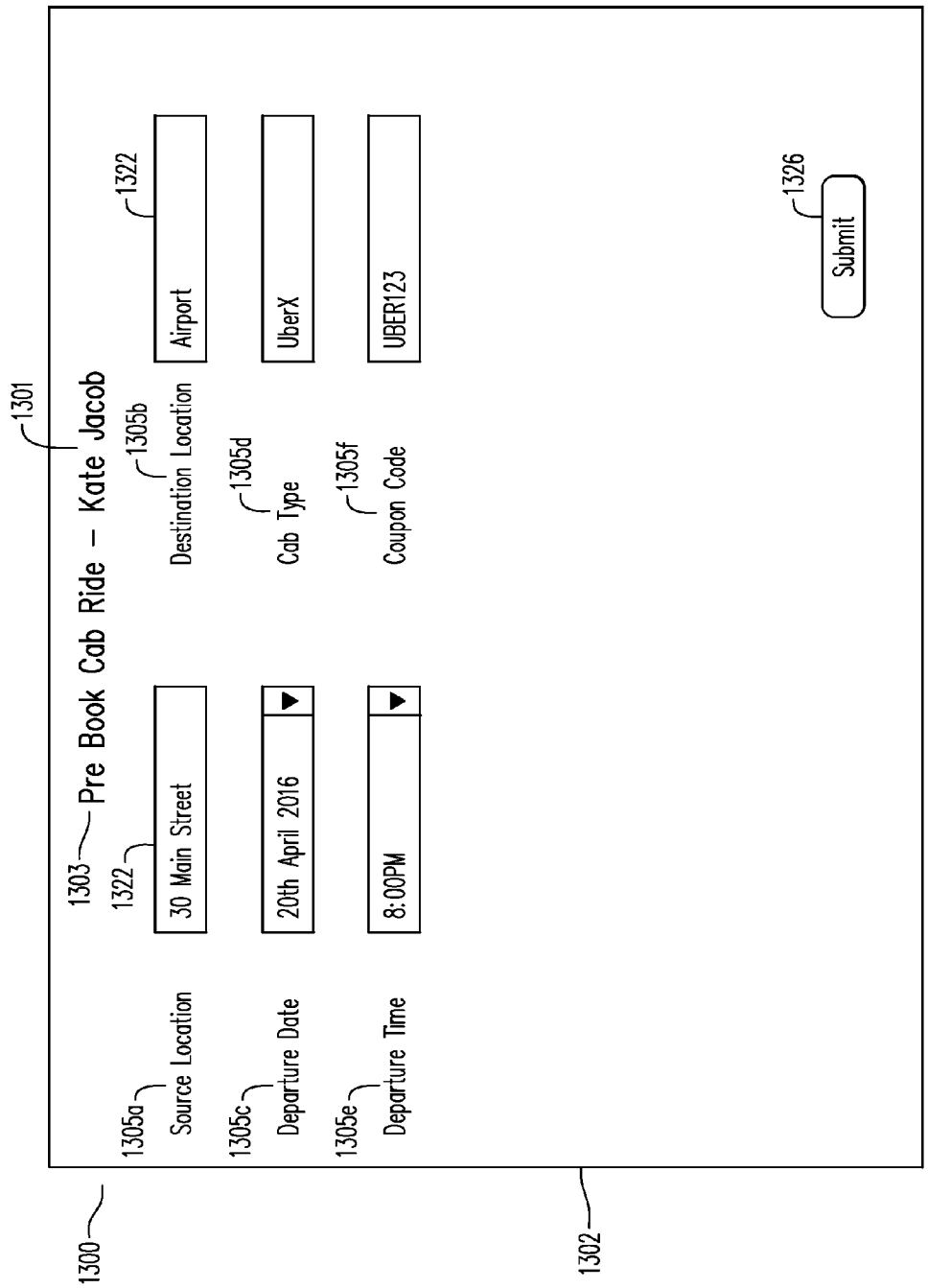
FIG. 13 is an outward view of a graphical interface according to some embodiments.
Figure 14:
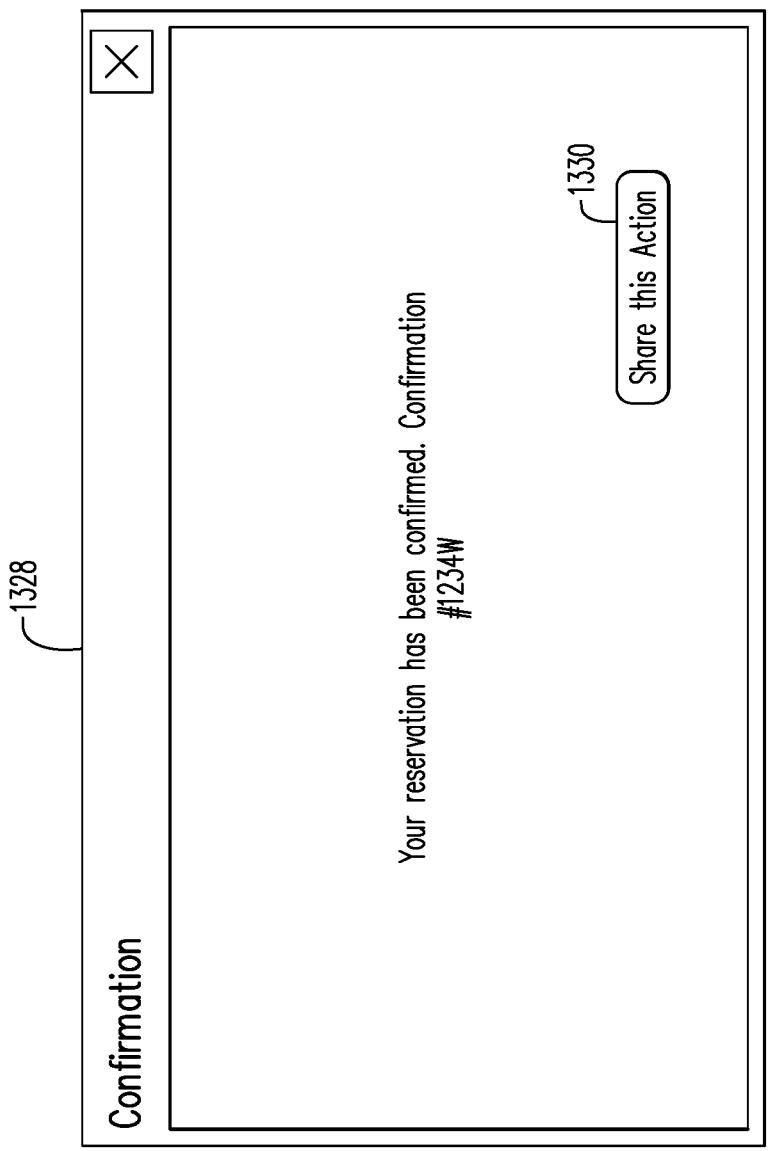
FIG. 14 is a text box according to some embodiments.

FIGS. 2-17 include a flow diagram of process 200 (FIG. 2) and process 1200 (FIG. 12) described with respect to an outward view of user interface 300/1300 according to some embodiments. Process 200/1200 may be executed by application server 130 according to some embodiments, e.g., by execution of the re-usable action app 135 to provide a user with access to the user interface 300/1300. In one or more embodiments, the application server 130 may be conditioned to perform the process 200/1200, such that a processor 1810 (FIG. 18) of the server 130 is a special purpose element configured to perform operations not performable by a general purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300/1300 may be presented on any type of display apparatus (e.g., desktop monitor, smartphone display, tablet display) provided by any type of client device (e.g., desktop system, smartphone, tablet computer). The application which is executed to provide user interface 300/1300 may comprise a Web Browser, a standalone application, or any other application. Embodiments are not limited to user interface 300 of FIG. 3 or user interface 1300 of FIG. 13.

As used herein, the term "smartphone" refers to any cellular phone that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets may typically come loaded with a web browser and a variety of applications ("apps"). As used here, the term "app" refers to a self-contained program or piece of software designed to fulfill a particular purpose.

Process 200 will first be described with respect to FIGS. 2-11 per a fictional enterprise application related to travel management, and then process 1300 will be described with respect to FIGS. 12-17 per a fictional pre-book cab ride application.

Regarding FIGS. 3-11, five employees in a company are going to travel internationally to attend a training. The first user (e.g., employee—Kate Jacob) knows that four other users are travelling with her. Prior to execution of process 200, an application developer/designer 150 may design the re-usable action app called "Plan Travel" 135. The first user (e.g., Kate Jacob) using the application 135 may share the application 135 with one or more other users. The one or more other users may re-use the application ("re-usable app") to save time.

An enterprise may provide a business management application for use by its employees across at least some portion of its enterprise. The application may be built or designed to suit the needs of the enterprise. When a user (e.g., employee—Kate Jacob) 302 logs-in and opens the business management application, user interface 300 may be presented on a display 301 with a plurality of selectable options (e.g., app finder 304, help 306, edit 308, settings 310, logout 312). Initially, at S210, the user 302 may also be presented with another option—a selectable re-usable action 314. The re-usable action 314 may include a core action 303 and one or more sub-actions 305 associated with the core action 303.

In S212, the user 302 selects the selectable re-usable action 314. Selection of the re-usable action 314 may result in a drop-down display 316 of options for the re-usable action 314. The options for the re-usable action 314 may include one or more already existing re-usable actions 318 and an option to create a new re-usable action 320. In one or more embodiments, the existing re-usable action 318 and the new re-usable action 320 may be referred to as the "core action" 303. The re-usable action (e.g., core action and one or more sub-actions) may be designed or created by a programmer or application designer. While a drop-down display 316 is shown herein, the existing re-usable actions 318 and option to create a new re-suable action 320 may be provided alternatively (e.g., in another screen, etc.).

In the example described herein, the first user 302 selects the already existing "Plan Travel" re-usable action 318. Then in S214, the user interface 300 displays one or more sub-actions 305 associated with the "Plan Travel" core action 303. Each sub-action 305 may be paired or associated with a user-entry sub-action field 322 to receive data related to the sub-action 305. For example, in FIG. 4, the sub-actions 305 associated with the "Plan Travel" core action 303 may be represented by user-entry sub-action fields Source Location 305*a*, Destination Location 305*b*, Departure Date 305*c*, Return Date 305*d*, Hotel Location 305*e*, Hotel Name 305*f*, Hotel Preferences 305*g*, Airport Transfer Pickup Date 305*h*, Time 305*i* and Source 305*j*, and Airport Transfer Drop-off Date 305*k*, Time 305*l* and Source 305*m*. The user interface 300 may receive data in the one or more user-entry sub-action fields 322 in S216, wherein the received data is entered by the first user 302. In some embodiments, the user-entry sub-action fields 322 may be drop-down lists, or free-form text entry fields. As used herein, a free-form text entry field permits the user to enter unstructured text (e.g., the user may enter their own text). For example, the first user 302 entering information in the user-entry Hotel Preferences sub-action field 322 in FIG. 4 may enter the following text: "Non-smoking; mid-floor; private bath." Another user may enter the following text: "Most important—private bath; then non-smoking; and if possible, mid-floor," for example.

In some embodiments, one or more sub-actions 305 may be designated as "required" by the application developer during the design of the app 135. In one or more embodiments, prior to continuing with the application 135, a required sub-action 305 receives data.

In the example described herein, the user 302 may select a next control 324 to continue to user interface display including more user-entry sub-actions 305 (e.g., Local Currency 305*n*, Destination Currency 305*o*, Currency Rate 305*p*, VISA 305*q*, Passport 305*r*, Invitation Letter—Inviting employee 305*s*, Address Proof Letter—Local HR—305*t*, Laptop Authorization Letter—Local IT 305*u*) and associated user-entry sub-action fields 322 (FIG. 5). In some embodiments, the sub-action 305 (e.g., Invitation Letter 305*s*, Address Proof Letter 305*t*, Laptop Authorization Letter 305*u*) may include another process (not shown) related to that sub-action 305.

After completing entry in the sub-action fields, the first user 302 submits the information via selection of a submit control 326 in S218, and the information is stored in memory 1830. In some embodiments, selection of the submit control 326 ceases an opportunity to alter the information in the sub-action fields In response to the submission of the information, a confirmation window 328 (FIG. 6) is displayed on the user interface with an option to share the action, as indicated by a pair of "share this action" radio buttons 330*a*, 330*b*, in S220. While radio buttons are shown herein, any other suitable indicator may be used. If the first user 302 does not wish to share the action, the user selects the "no" radio button 330*b*, and the process 200 ends S221.

Figure 7:
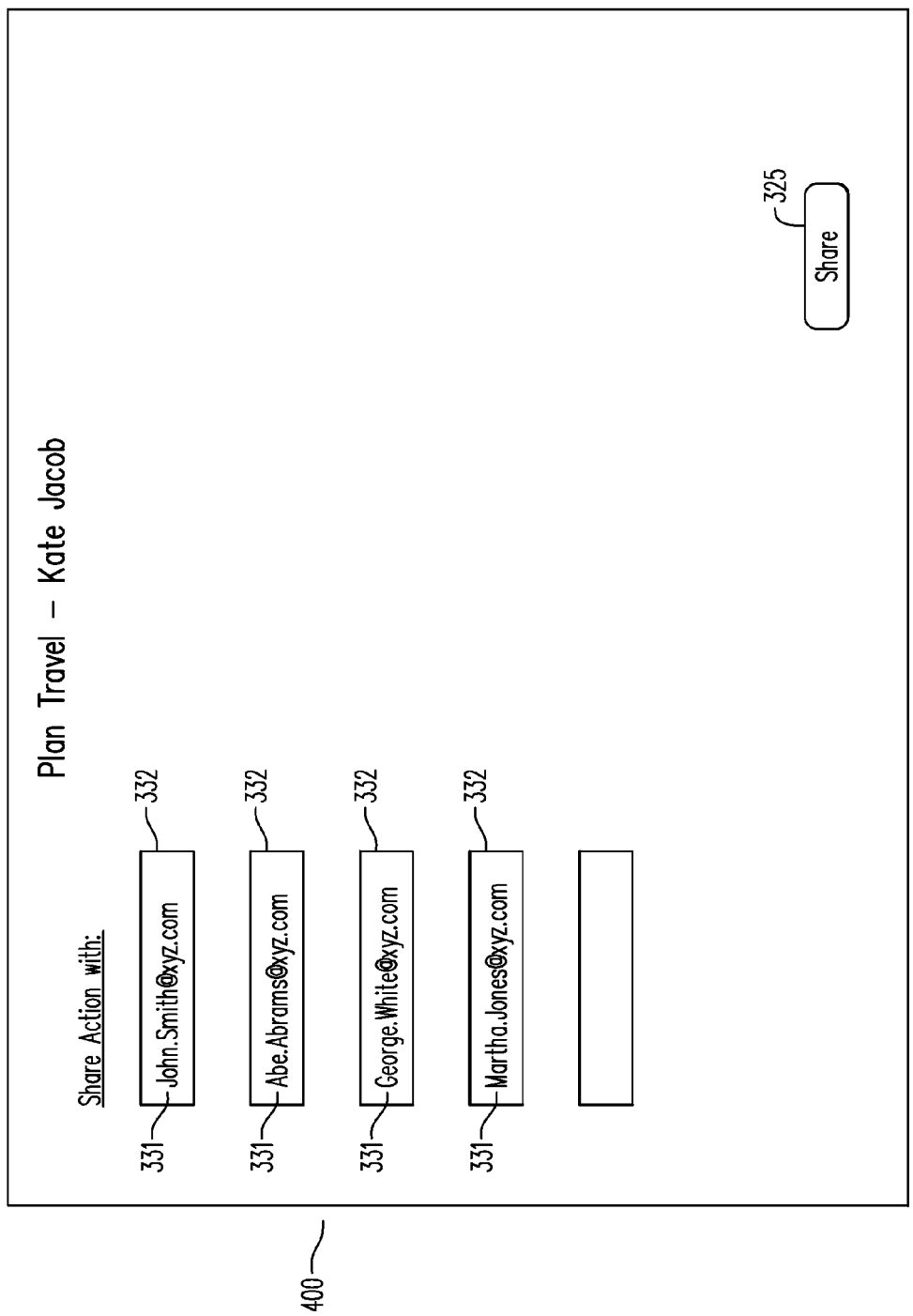
FIG. 7 is an outward view of a graphical interface according to some embodiments.
Figure 8:
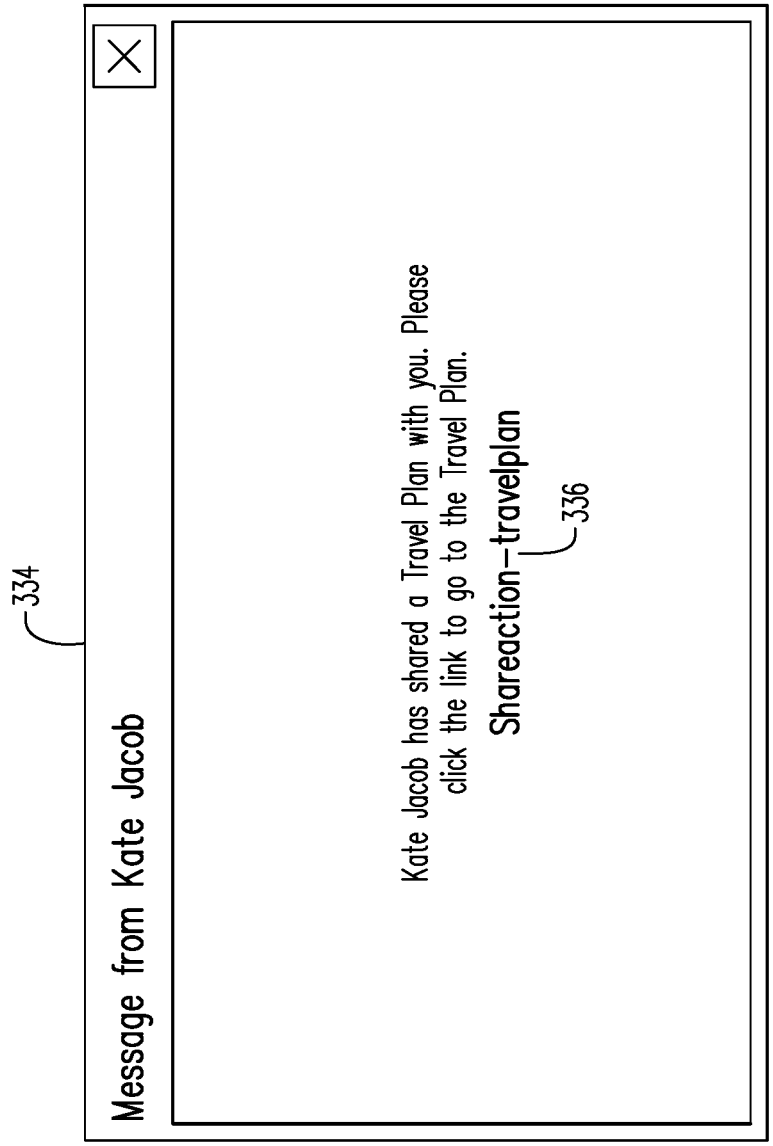
FIG. 8 is a text box according to some embodiments.
Figure 9:
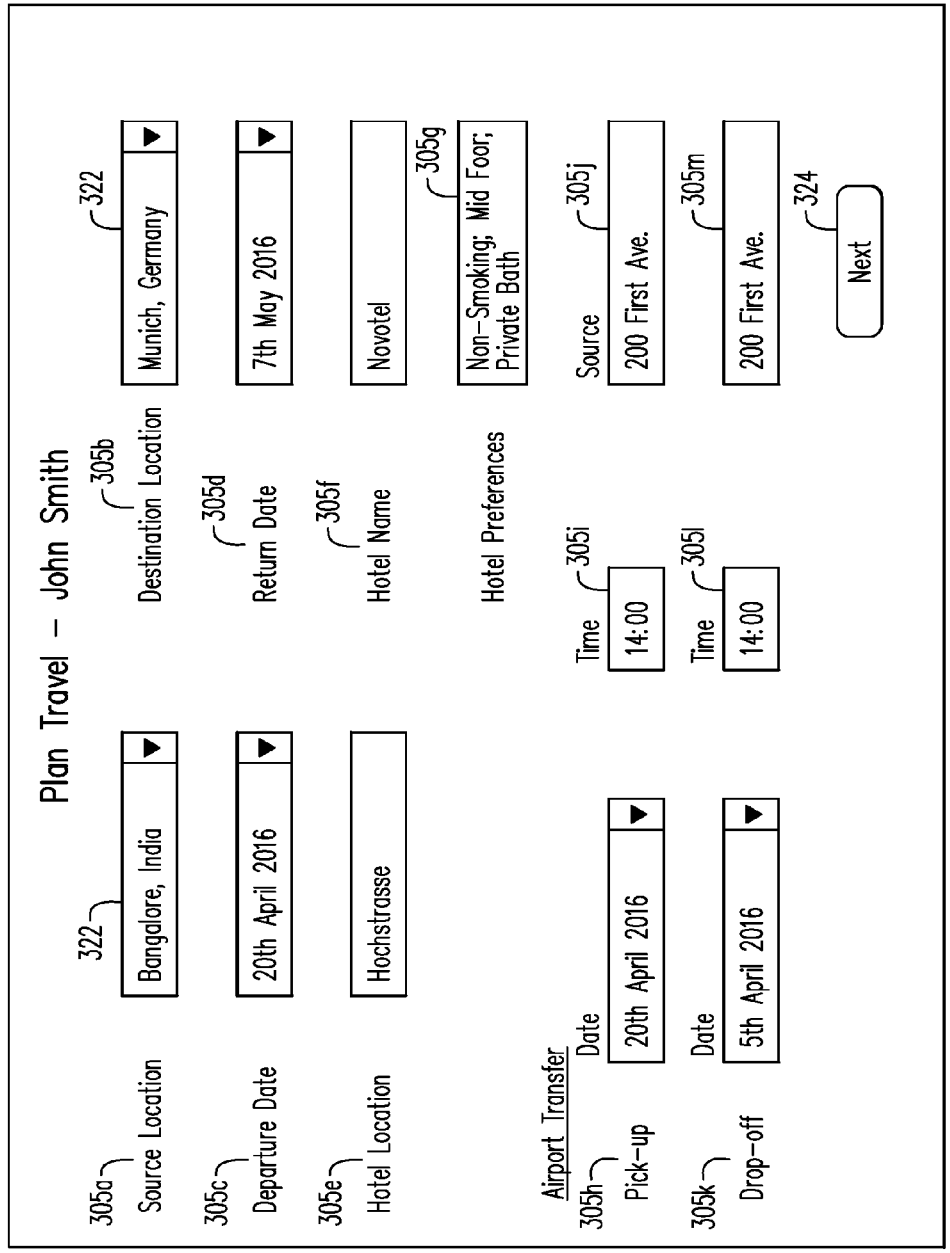
FIG. 9 is an outward view of a graphical interface according to some embodiments.

If the first user 302 wishes to share the action, the first user 302 selects the "yes" radio button 330*a*, and the process 200 proceeds to S222 and a display of the user interface 300 displaying a list of one or more selectable additional users 331 is provided. For example, FIG. 7 illustrates user interface 300 after selection of the submit control 326. In S224, the one or more other users 331 are selected for receipt of the core action 303. The first user 302 may enter an e-mail address, phone number or other suitable contact information of the one or more users to receive the core action 303 into one or more other user fields 332. While the other user fields are shown in FIG. 7 as text boxes, in some embodiments, drop-down lists or other suitable other user identifiers may be used. The first user 302 may submit the other user contact information via selection of the submit control 325 in S226.

After submission of the other user contact information, each of the other users 331 receives a notification 334 (FIG. 8) in S228 that the first user 302 has shared the core action app 135 with them. In some embodiments, the notification 334 may include a hyperlink 336 to the re-usable core action 135. In other embodiments, the notification 334 may include other links or ways to connect to the core action app 135 (e.g., radio buttons etc.). In S230, the other user 331 decides whether to select the hyperlink 336. If the other user 331 decides in S230 to ignore the notification and not select the hyperlink 336, the other user 331 may close the notification and the process ends S221. If the other user 331 decides in S230 to select the hyperlink 336, the other user 331 is taken to user interface 300 (FIG. 9) and the process 200 proceeds back to S214 with the other user 331 now in the role of the first user 301. The sub-action fields 322 of user interface 300 may already be pre-populated with the data entered by the first user 302. The other user 331 may decide to keep the pre-populated information or change the data in one or more fields. For example, the other user 331 may change the address of the airport transfer information 305j, 305m to coincide with their residence. A benefit of embodiments is that the other user is able to save time and resources by having a user interface including the sub-tasks associated with completing a core action or task, and having the information pre-populated and not having to enter all of the information. In some embodiments, when the other user 331 is presented with the user interface 300 for entering contact information of other users to share the re-usable action app 135 (FIG. 11), the user interface 300 may include a list 338 of other users the re-usable action app 135 has already been shared with. The benefit of this is that the other user 331 may review who has received the re-usable action app 135 so that they may determine if the appropriate people have received the re-usable action app 135 of if they want to share it with other users.

Turning to FIGS. 12-17, two people are going to travel to the airport on Sunday via a cab, but at different times. The first user knows that the second user is also planning this journey. Initially, at S1210 the first user (e.g., Kate Jacob) 1301 opens the pre-book cab ride application, and a user interface 1300 (FIG. 13) is displayed on a display 1302, the user interface 1300 displaying one or more sub-actions 1305 associated with the "pre-book cab ride" core action 1305. Each sub-action 1305 may be paired with a user-entry sub-action fields 1322 to receive data related to the sub-action 1305. For example, in FIG. 13, the sub-actions 1305 associated with the "pre-book cab ride" core action 1303 may be Source Location 1305a, Destination Location 1305b, Departure Date 1305c, Cab type 1305d, Departure time 1305e, Coupon Code 1305f.

Then in S1212 the user interface 1300 receives data in the one or more user-entry sub-action fields 1322. As described above with respect to the travel plan application, in some embodiments the user-entry sub-action fields 1322 may be drop-down lists, or free-form text entry fields. In some embodiments, one or more sub-action fields 1322 may be designated as "required" by the application developer during the design of the app 135. In one or more embodiments, prior to continuing with the application 135, a required sub-action field 1322 receives data.

Figure 18:
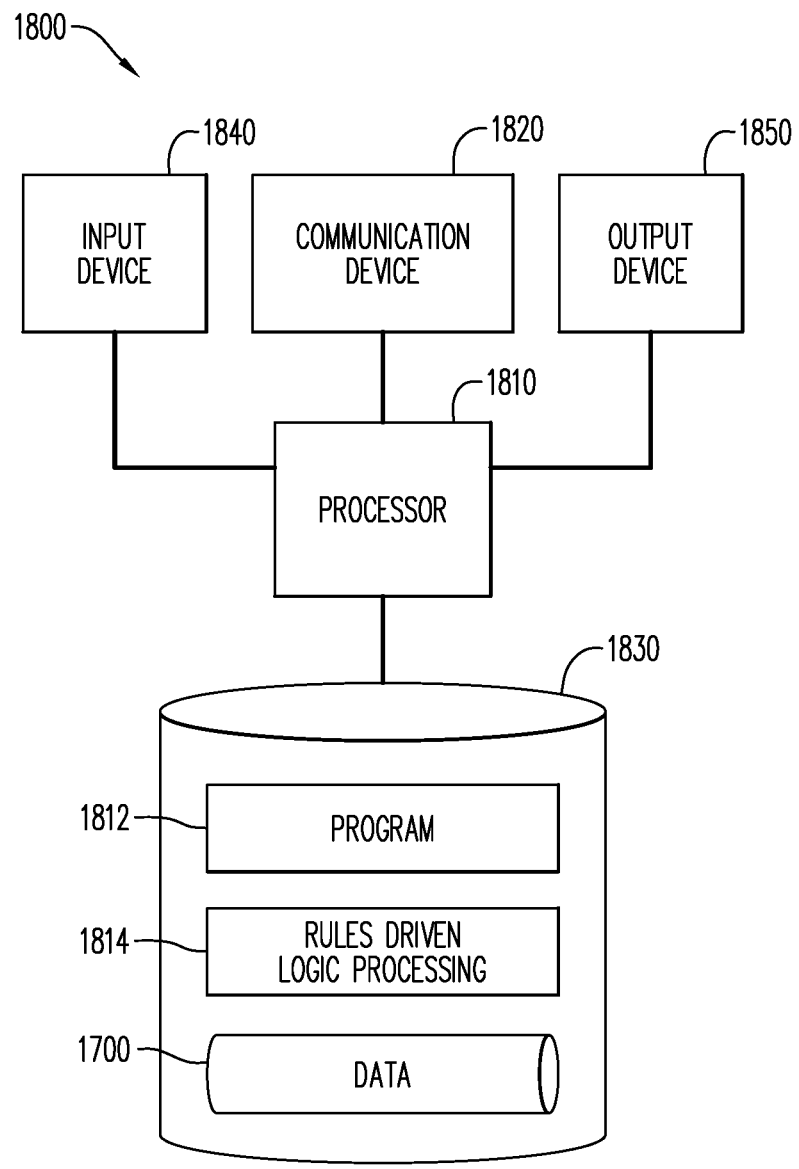
FIG. 18 is a block diagram of a system according to some embodiments.

After completing entry in the sub-action fields 1322, the first user 1301 submits the information via selection of a submit control 1326 in S1214, and the information is stored in memory 1830 (FIG. 18).

In response to the submission of the information, a confirmation window 1328 (FIG. 14) may be displayed on the user interface. In some embodiments, the confirmation window 1328 may display an option to share the action, as indicated by a "share this action" control 1330. In S1216, the first user 1301 decides whether to share the action. If the first user 1301 does not wish to share the action, the first user 1301 closes confirmation window 1328, and the process 1200 ends at S1218.

Figure 15:
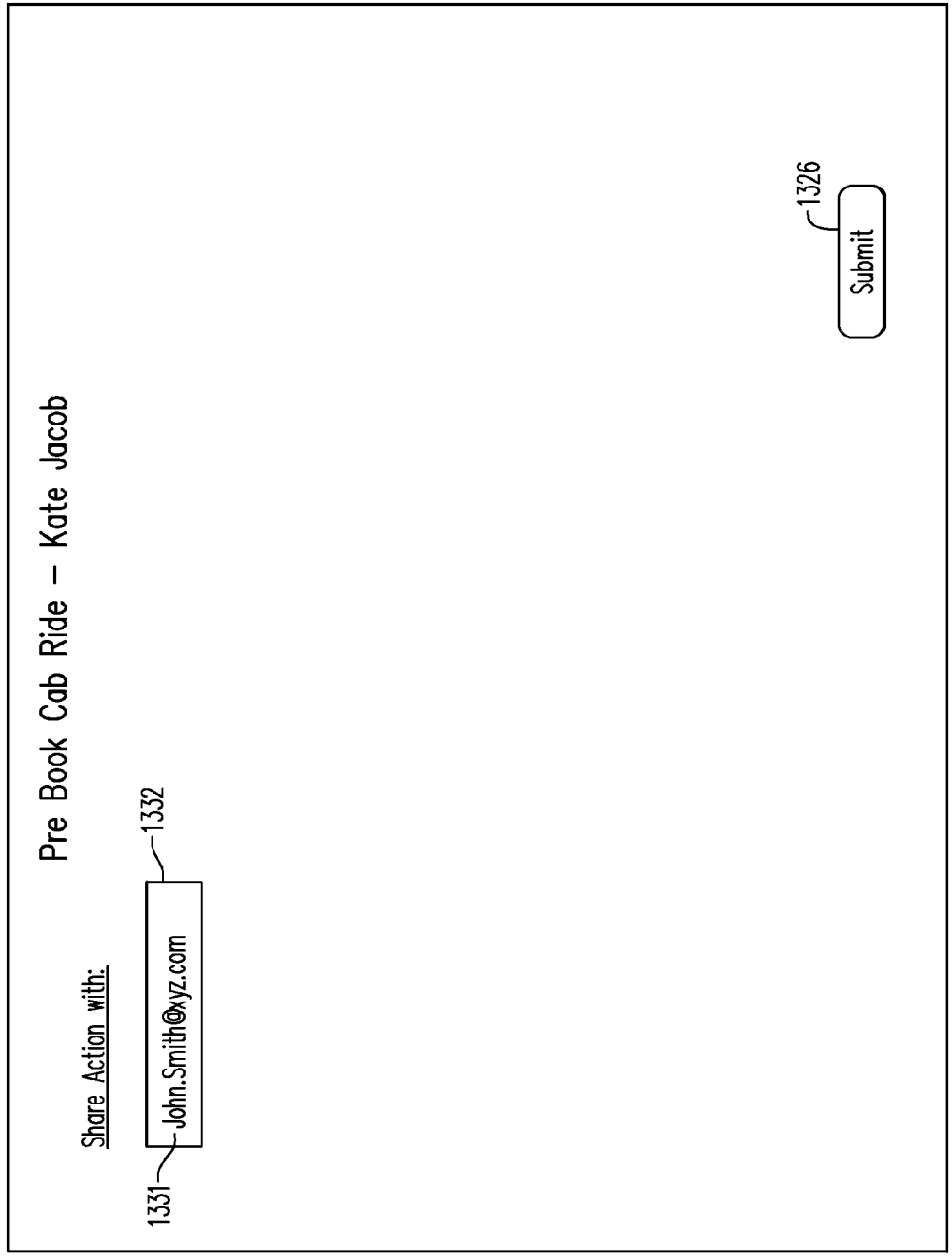
FIG. 15 is an outward view of a graphical interface according to some embodiments.
Figure 16:
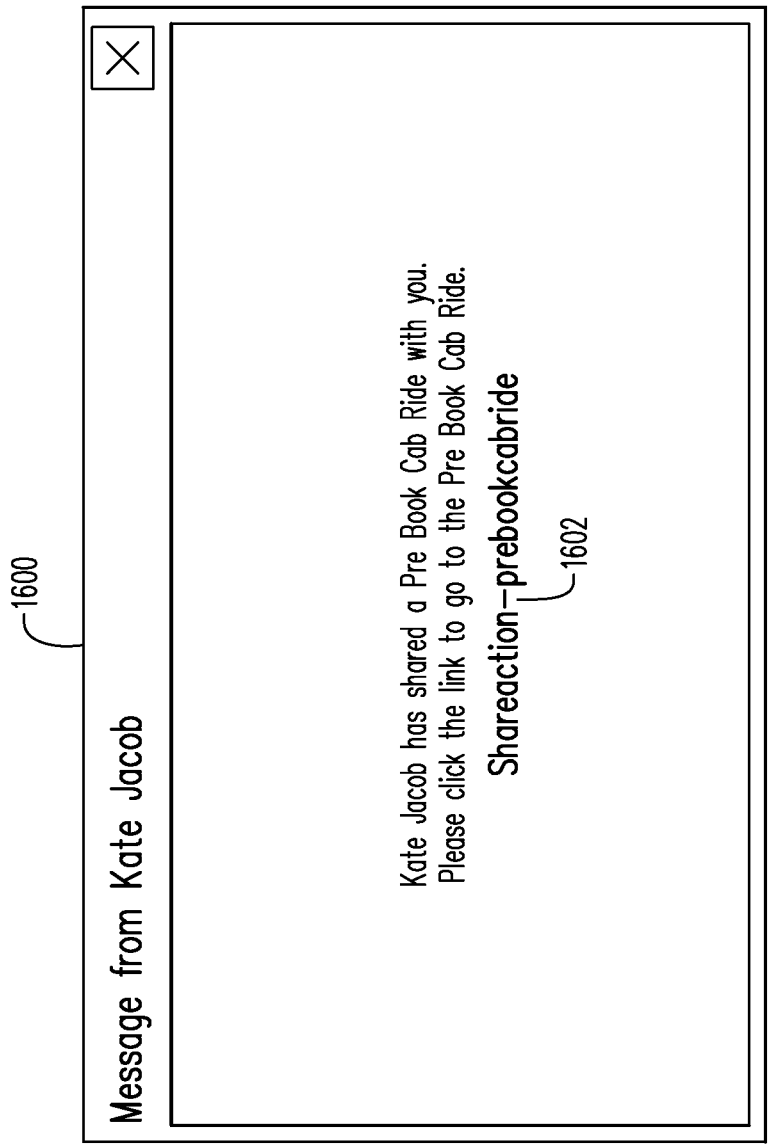
FIG. 16 is a text box according to some embodiments.

If the first user 1301 wishes to share the action, the first user 1301 selects the "share this action control" 1330. FIG. 15 illustrates user interface 1300 after selection of the "share this action" control 1330. In S1220, one or more other users 1331 are selected for receipt of the core action 1303. The first user 1301 may enter an e-mail address, phone number or other suitable contact information of the one or more other users 1331 to receive the core action 1303 into one or more other user fields 1332. While the other user fields 1332 are shown in FIG. 15 as text boxes, in some embodiments, drop-down lists or other suitable other user identifiers may be used. The first user 1301 may submit the other user 1331 contact information via selection of the submit control 1326 in S1222.

After submission of the other user contact information, each of the other users 1331 receives a notification 1600 (FIG. 16) in S1224 that the first user 1301 has shared the core action app 135 with them. In some embodiments, the notification 1600 may include a hyperlink 1602 to the re-usable core action 135. In S1226, the other user 1331 decides whether to select the hyperlink 1602. If the other user 1331 decides in S1226 to ignore the notification and not select the hyperlink 1602, the other user 1331 may close the notification, and the process ends S1218. If the other user 1331 decides in S1226 to select the hyperlink 1602, the other user 1331 is taken to user interface 1300 (FIG. 17) with the other user (e.g., John Smith) now in the position of the first user and the process 1200 proceeds back to S1210. The sub-action fields 1322 of user interface 1300 may already be pre-populated with the data entered by the first user 1301. The other user 1331 may decide to keep the pre-populated information or change some of it. For example, the other user 1331 may change the source location 1305a to coincide with their residence. A benefit of embodiments is that by not having to enter all of the information, the other user is able to save time and resources.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

FIG. 18 is a block diagram of apparatus 1800 according to some embodiments. Apparatus 1800 may comprise a general- or special-purpose computing apparatus and may execute program code to perform any of the functions described herein. Apparatus 1800 may comprise an implementation of one or more elements of system 100. Apparatus 1800 may include other unshown elements according to some embodiments.

Apparatus 1800 includes re-usable action processor 1810 operatively coupled to communication device 1820, data storage device 1830, one or more input devices 1840, one or more output devices 1850 and memory 1860. Communication device 1820 may facilitate communication with external devices, such as application server 130. Input device(s) 1840 may comprise, for example, a keyboard, a keypad, a mouse or other pointing device, a microphone, knob or a switch, an infra-red (IR) port, a docking station, and/or a touch screen. Input device(s) 1840 may be used, for example, to manipulate graphical user interfaces and to input information into apparatus 1800. Output device(s) 1850 may comprise, for example, a display (e.g., a display screen) a speaker, and/or a printer.

Data storage device/memory 1830 may comprise any device, including combinations of magnetic storage devices (e.g., magnetic tape, hard disk drives and flash memory), optical storage devices, Read Only Memory (ROM) devices, Random Access Memory (RAM) etc.

The storage device 1830 stores a program 1812 and/or re-usable action platform logic 1814 for controlling the processor 1810. The processor 1810 performs instructions of the programs 1812, 1814, and thereby operates in accordance with any of the embodiments described herein, including but not limited to processes 200 and 1200.

The programs 1812, 1814 may be stored in a compressed, uncompiled and/or encrypted format. The programs 1812, 1814 may furthermore include other program elements, such as an operating system, a database management system, and/or device drivers used by the processor 1810 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
    a display;
    a memory storing processor-executable process steps; and
    a processor to execute the processor-executable process steps to cause the system to:
        present a user interface on a display, the user interface including one or more sub-actions associated with a core action, and one or more user-entry sub-action fields associated with the one or more sub-actions;
        receive data in one or more of the displayed user-entry sub-action fields, wherein the received data is entered by a first user;
        present a sharable action indicator in response to reception of the data in the one or more displayed user-entry sub-action fields;
        in response to a first user selection of the sharable action indicator, display a list of one or more additional users; and
        in response to selection by the first user of at least one of the one or more additional users, transmit a notification to the selected one or more additional users indicating that the core action has been shared with them by the first user.

2. The system of claim 1, wherein the notification includes a link to connect to the core action, and the processor to further execute the processor-executable process steps to cause the system to:
    detect a selection by one of the selected one or more additional users of the link in the notification; and
    in response to detection of the selection, display the one or more sub-actions and user-entry sub-action fields associated with the core action to the one of the selected one or more additional users.

3. The system of claim 2, wherein the one or more user-entry sub-action fields are pre-populated with data entered by the first user.

4. The system of claim 1, wherein one of the one or more user-entry sub-action fields is pre-populated with data entered by the first user and one or more additional user-entry sub-action fields are one of pre-populated with data entered by the first user and blank.

5. The system of claim 1, wherein each of one or more user-entry sub-action fields is operative to receive one of a user entered text and a selection of an item from a pre-populated list.

6. The system of claim 3, wherein the user interface further comprises:
    a submit control, wherein selection of the submit control ceases an opportunity to alter data in the one or more user-entry sub-action fields.

7. The system of claim 6, wherein the additional user selects the submit control without altering data in at least one of the one or more user-entry sub-action fields.

8. The system of claim 6, wherein the additional user alters data in at least one of the one or more user-entry sub-action fields prior to selection of the submit control.

9. The system of claim 1, wherein data entry in at least one of the one or more user-entry sub-action fields is required for completion of the core action.

10. A computer-implemented method comprising:
    presenting a user interface on a display, the user interface including one or more sub-actions associated with a core action, and one or more user-entry sub-action fields associated with the one or more sub-actions;

receiving data in one or more of the displayed user-entry sub-action fields, wherein the received data is entered by a first user;

presenting a sharable action indicator in response to reception of the data in the one or more displayed user-entry sub-action fields;

in response to a first user selection of the sharable action indicator, displaying a list of one or more additional users;

selecting one or more additional users for receipt of the core action; and transmitting a notification to the selected one or more additional users indicating that the core action has been shared with them by the first user.

11. The method of claim 10, wherein the notification includes a link, and further comprising:

detecting a selection by one of the selected one or more additional users of the link in the notification; and in response to detection of the selection, displaying the one or more sub-actions and user-entry sub-action fields associated with the core action to the one of the selected one or more additional users.

12. The method of claim 11, wherein the one or more user-entry sub-action fields are pre-populated with data entered by the first user.

13. The method of claim 11, wherein one of the one or more user-entry sub-action fields is pre-populated with data entered by the first user and one or more additional user-entry sub-action fields are one of pre-populated with data entered by the first user and blank.

14. The method of claim 10, further comprising:

receiving in one or more user-entry sub-action fields one of a user entered text and a selection of an item from a pre-populated list.

15. The method of claim 12, further comprising:

selecting a submit control to cease an opportunity to alter data in the one-or more user-entry sub-action fields.

16. The method of claim 15, further comprising:

selecting the submit control, via the additional user, without altering data in at least one of the one or more user-entry sub-action fields.

17. The method of claim 15, further comprising:

altering data in at least one of the one or more user-entry sub-action fields; and selecting the submit control after alteration of data in at least one of the one or more user-entry sub-action fields.

18. A non-transitory computer-readable medium storing program code, the program code executable by a computer system to cause the computer system to:

present a user interface on the display, the user interface including one or more sub-actions associated with a core action, and one or more user-entry sub-action fields associated with the one or more sub-actions;

receive data in one or more of the displayed user-entry sub-action fields, wherein the received data is entered by a first user;

present a sharable action indicator in response to reception of the data in the one or more displayed user-entry sub-action fields;

in response to a first user selection of the sharable action indicator, display a list of one or more additional users; and in response to selection by the first user of at least one of the one or more additional users, transmit a notification to the selected one or more additional users indicating that the core action has been shared with them by the first user.

19. The medium of claim 18, wherein the notification includes a link to connect to the core action, and the program code is further executable by the computer system to cause the computer system to:

detect a selection by one of the selected one or more additional users of the link in the notification; and in response to detection of the selection, display the one or more sub-actions and user-entry sub-action fields associated with the core action to the one of the selected one or more additional users.

20. The medium of claim 19, wherein the one or more user-entry sub-action fields are pre-populated with data entered by the first user.

* * * * *